US006707859B1

United States Patent
Kinnunen et al.

(10) Patent No.: US 6,707,859 B1
(45) Date of Patent: Mar. 16, 2004

(54) RECEPTION METHOD AND RECEIVER USING SEVERAL DIFFERENT TRANSPORT FORMATS

(75) Inventors: Pasi Kinnunen, Oulu (FI); Sami Salonen, Oulu (FI); Outi Rikola, Oulu (FI); Anu Virtanen, Helsinki (FI)

(73) Assignee: Nokia Corporation, Espoo (FI)

(*) Notice: Subject to any disclaimer, the term of this patent is extended or adjusted under 35 U.S.C. 154(b) by 431 days.

(21) Appl. No.: 09/638,458

(22) Filed: Aug. 14, 2000

Related U.S. Application Data

(63) Continuation of application No. PCT/FI99/00999, filed on Dec. 2, 1999.

(30) Foreign Application Priority Data

Dec. 14, 1998 (FI) .................................................. 982701

(51) Int. Cl.[7] .............................................. H04L 27/16
(52) U.S. Cl. ....................... 375/316; 375/130; 375/148; 375/262; 370/335; 370/342
(58) Field of Search ................................. 375/316, 130, 375/148, 260, 262; 370/321, 335, 342, 347

(56) References Cited

U.S. PATENT DOCUMENTS

| | | | |
|---|---|---|---|
| 5,673,266 A | * 9/1997 | Li | 370/465 |
| 5,710,784 A | 1/1998 | Kindred et al. | 375/262 |
| 5,831,978 A | 11/1998 | Willars et al. | 370/335 |
| 6,169,759 B1 | * 1/2001 | Kanterakis et al. | 375/130 |
| 6,353,638 B1 | * 3/2002 | Hottinen et al. | 375/260 |
| 6,498,936 B1 | * 12/2002 | Raith | 455/466 |

FOREIGN PATENT DOCUMENTS

| EP | 0 854 596 A1 | 7/1998 |
|---|---|---|
| EP | 0 913 971 A2 | 5/1999 |

OTHER PUBLICATIONS

The ETSI UMTS Terrestrial Radio Access (UTRA) ITU–R RTT Candidate Submission, May/Jun., 1998.

* cited by examiner

Primary Examiner—Shuwang Liu
(74) Attorney, Agent, or Firm—Squire, Sanders & Dempsey L.L.P.

(57) ABSTRACT

The invention relates to a receiver and a reception method in a data transmission system wherein a signal to be transmitted can comprise information that is transmitted in a frame form by using several different transport formats, in which frames also information on the transport format used is transmitted by means of transport format indicators, and in which system the information to be transmitted is coded by a coding depth depending on the properties of the information to be transmitted, at least some of the coding depths being multiples of a given basic coding depth Tk. In order to express the transmission mode reliably when the signal is received which is known to contain information coded by using a coding depth of n*Tk, if it is detected that n−x frames have been received, where a positive integer x is lower than n, in which frames transport format indicators have been identified indicating that the frame comprises the information coded using the known coding depth n*Tk, and x frames wherein the transport format indicators do not indicate that the signal comprises the information coded using the known coding depth n*Tk, it is inferred that the x frames in question have been received erroneous.

11 Claims, 5 Drawing Sheets

RECEPTION METHOD AND RECEIVER USING SEVERAL DIFFERENT TRANSPORT FORMATS

This application is a continuation of international application serial number PCT/FI99/00999, filed Dec. 2, 1999.

FIELD OF THE INVENTION

The invention relates to a receiver and a reception method in a data transmission system wherein a signal to be transmitted can comprise information transmitted in a frame form by using several different transport formats and in which method the transport formats used at a given time are indicated in the frame. The invention relates Particularly to how errors can be detected in indicating a transmission rate.

BACKGROUND OF THE INVENTION

Requirements set to data transmission systems are on the increase. This relates particularly to wireless data transmission systems, such as cellular radio systems that are to provide more and more accomplished services, such as different data and video services, for example.

Conventionally, wireless data transmission systems have only been used for transmitting speech. The increasing number of different services to be transmitted particularly in wireless systems means that a system must be capable of transmitting over a radio path signals with different capacities, such as speech at a data rate of 8 kbit/s and data at a rate of 64 kbit/s. In addition, it is also necessary to transmit signals that have different quality levels, the signals typically requiring also different data rates simultaneously. A typical example is a video connection wherein image necessitates a high data rate and quality level while voice allows to be transmitted at a lower data rate and quality level. Hence, the data transmission system should be capable of operating efficiently in an environment where transmissions of several different data rates, quality levels and service types are transmitted.

It is typical of digital data transmission systems in particular that signals are transmitted in a frame form. A frame comprises a plurality of time slots. In systems where data can be transmitted by several different transport formats it is necessary to indicate in each frame which transport format is used in the frame. The different transport formats are often implemented by variations either in the size of the data part of a time slot or in the coding used in connection with transmitting the data. In principle, the transport format can vary frame by frame or time slot by time slot.

Since the quality of signals varies, it is obvious that different coding is used for signals of different types. Hence, the depth of channel coding, for example, varies according to different signals. This can be exemplified by speech and video connections, on which a coding depth of the length of one frame is typically used for speech, and a channel coding depth of the length of k frames, where k>1, is typically used for video. The transport format and coding depth used at a given time are indicated by transport format indicators TFI that are transmitted over a dedicated control channel.

When one or more services with the same channel coding depth is/are transmitted over one radio link, coding of the transport format indicators can be implemented over the same time period as data, as is the case in the prior art solutions. The coding of the transport format indicators must then be carried out according to a service using the smallest coding depth in order to avoid additional delays on the radio link. The problem with the prior art solution is that the transport format indicators cannot utilise the same interleaving as the data that has a greater coding depth. Thanks to interleaving, the bit error ratio BER of the data decreases; this does not, however, apply to the transport format indicators.

For the above reason, transport format indicators may be more susceptible to errors than data bits. If the transport format indicators are erroneous, the demultiplexing of services and the setting of transmission rates are carried out erroneously at the receiver. The input of a viterbi- and turbo-decoder receives random bits, which means that the contents of a frame processed erroneously cannot be decoded in a correct manner.

BRIEF DESCRIPTION OF THE INVENTION

An object of the invention is thus to provide a method and an apparatus implementing the method such that the problems mentioned above can be solved. This is achieved by a reception method in a data transmission system of the invention, in which system a signal to be transmitted can comprise information transmitted in a frame form by using several different transport formats, in which frames also information on the transport format used is transmitted by means of transport format indicators, and in which system the information to be transmitted is coded by using a coding depth depending on the properties of the information to be transmitted, at least some of the coding depths being multiples of a given basic coding depth $T_K$. In the method of the invention, when a signal is received which is known to contain information coded by using a coding depth of $n^*T_K$, if it is detected that n−x frames have been received, where a positive integer x is lower than n, in which frames transport format indicators have been identified indicating that the frame comprises the information coded using the known coding depth $n^*T_K$, and x frames wherein the transport format indicators do not indicate that the signal comprises the information coded using the known coding depth $n^*T_K$, it is inferred that the x frames in question have been received erroneous.

The invention further relates to a receiver in a data transmission system wherein a signal to be transmitted can comprise information that is transmitted in a frame form by using several different transport formats, in which frames also information on the transport format used is transmitted by means of transport format indicators, and in which system the information to be transmitted is coded by a coding depth depending on the properties of the information to be transmitted, at least some of the coding depths being multipies of a given basic coding depth $T_K$ When a signal which is known to comprise information coded by using a coding depth of $n^*T_K$ is received at a receiver of the invention, the receiver of the invention comprises means for detecting that n−x frames have been received, where a positive integer x is lower than n, and means for identifying from the frames the transport format indicators indicating that the frame comprises the information coded using the known coding depth $n^*T_K$, and means for detecting that x frames have been received in which the transport format indicators do not indicate that the signal comprises the information coded using the known coding depth $n^*T_K$, and means for inferring that the x frames in question have been received erroneous.

The preferred embodiments of the invention are disclosed in the dependent claims.

The invention is based on the idea that when it is known that a service whose coding depth is n frames is about to be received, and that frames which should, according to the number of previous frames, include said service are about to be received, and when such transport format indicators are detected according to which the frame does not include said service, it can be inferred from this that an error has occurred in the reception.

Several advantages are achieved by the method and arrangement of the invention. Since errors can be detected in reception already prior to decoding, decoding errors can be decreased by setting the erroneous bits to zero since bits set to zero cause a smaller error than random erroneous bits do.

BRIEF DESCRIPTION OF THE DRAWINGS

The invention is now described in closer detail in connection with the preferred embodiments with reference to the accompanying drawings, in which.

DETAILED DESCRIPTION OF THE INVENTION

Figure 1:
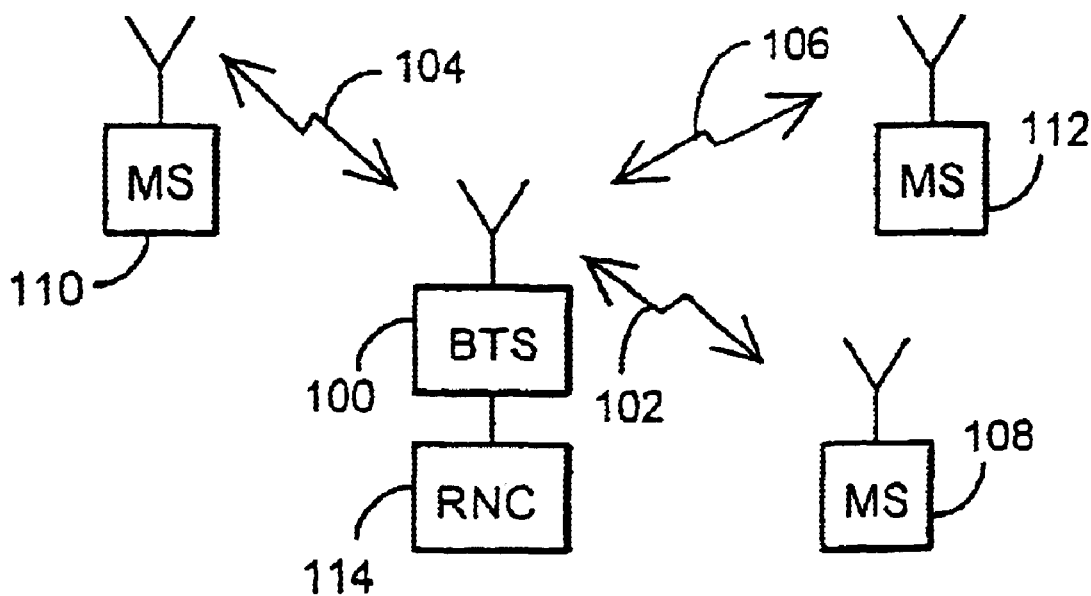
FIG. 1 illustrates an example of a telecommunication system to which the invention can be applied.

The present invention can be used in different mobile telephone systems that allow a signal comprising information to be simultaneously transmitted at several different transmission rates and quality requirements. It is irrelevant which multiple access method the system uses. For example, CDMA, WCDMA and TDMA are feasible multiple access methods. FIG. 1 illustrates a digital data transmission system to which the solution of the invention can be applied. The figure only shows part of a cellular radio system which comprises a base station 100 having a duplex connection 102 to 106 to user equipment 108 to 112. The base station is further connected to a base station controller 114 relaying the connections of the terminals elsewhere to the network. In the simplified example of FIG. 1, a signal to be transmitted on the duplex connections 102 to 106 between 108 to 112 the user equipment and the base station can thus comprise information that is transmitted using several different transport formats. Signals are transmitted in a frame form, and in the frames, also the information on the transport format is transmitted by means of transport format indicators. The information to be transmitted is coded using a coding depth that can be dependent on the transmission rate, desired quality of the signal, maximum delay and transmission direction of the information, for example.

Hereinafter, the use of the invention will be described in a mobile telephone system using a broadband code divisional multiple access method implemented by direct sequence technique without, however, restricting the invention thereto. Hence, a proposal for the IMT-2000 mobile telephone system advanced by ARIB (Association of Radio Industries and Businesses) in Japan is a system in accordance with the invention. The examples are based on the description of the WCDMA system, which can be further studied in the ETSI (European Telecommunications Standards Institute) specification "The ETSI UMTS Terrestrial Radio Access (UTRA) ITU-R RTT Candidate Submission (Tdoc SMG2 260/98, May/June 1998)", which is incorporated herein by reference.

Figure 2:
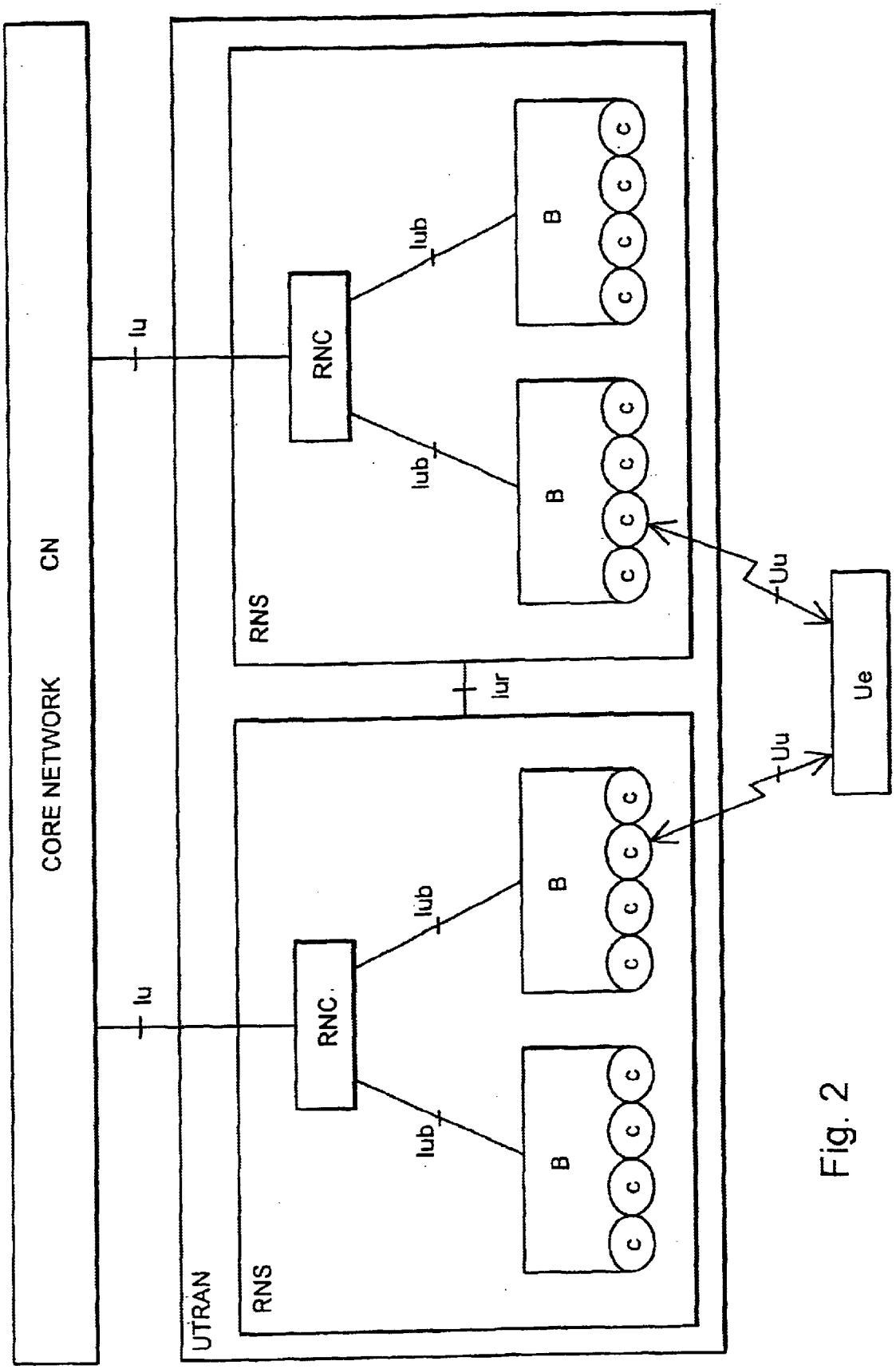
FIG. 2 shows the structure of a second mobile telephone system used as an example.

Referring to FIG. 2, the structure of a mobile telephone system of the invention will be described. The main parts of the mobile telephone system include a core network CN, a UMTS terrestrial radio access network UTRAN, and user equipment UE. The interface between the CN and the UTRAN is called Iu, and the air interface between the UTRAN and the UE is called Uu.

The radio connection network comprises radio network subsystems RNS. The interface between the subsystems is called Iur. Each radio network subsystem RNS comprises a radio network controller RNC and one or more nodes B. The interface between the radio network controller RNC and the node B is called Iub. The coverage area of node B, i.e. the cell, is denoted by C in FIG. 2.

Figure 3:
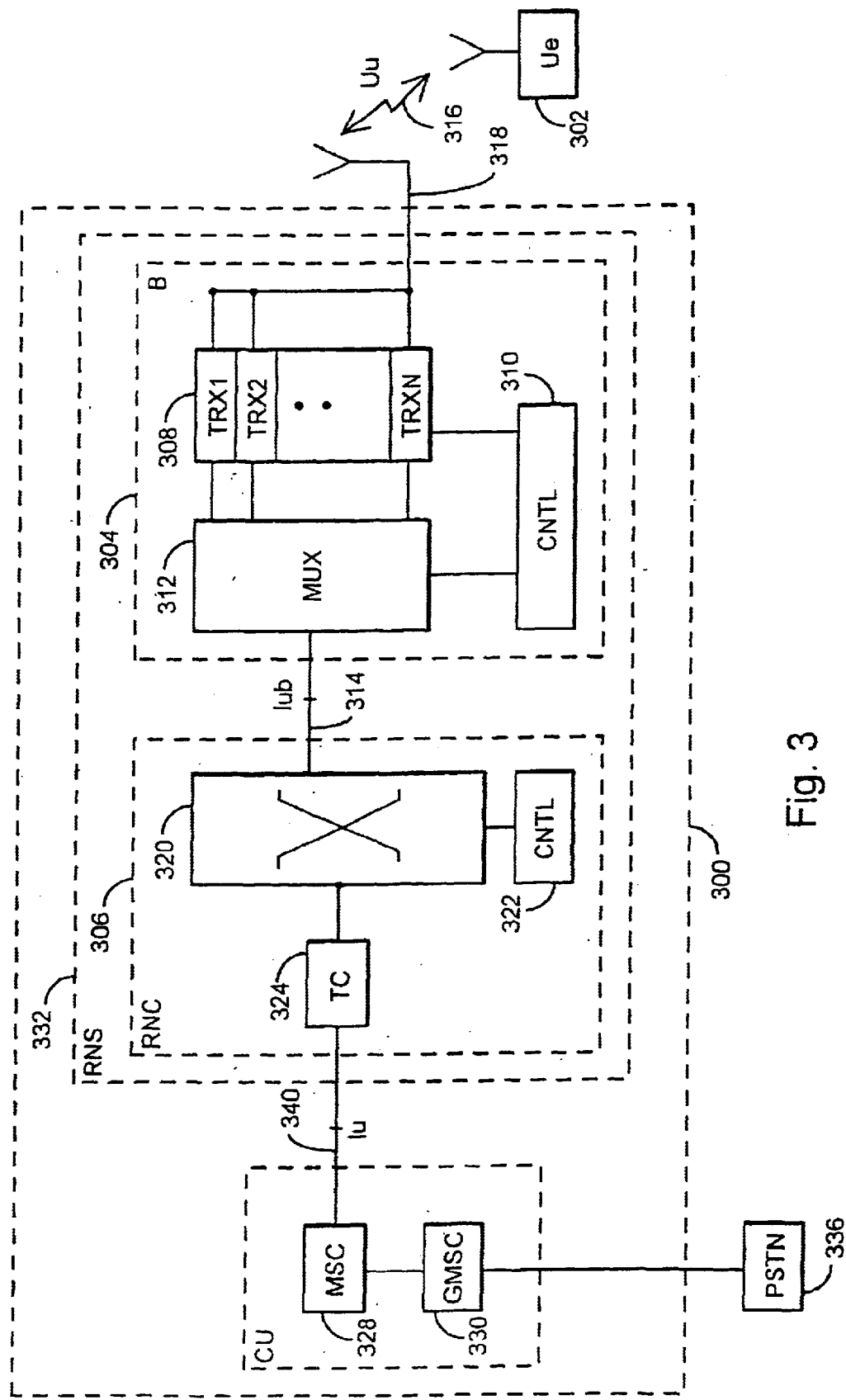
FIG. 3 illustrates the structure of the mobile telephone system used as an example in closer detail.

Being rather abstract, the description in connection with FIG. 2 will be further clarified by a more detailed example of the cellular radio system in FIG. 3. FIG. 3 only comprises the most essential blocks, but it is obvious to those skilled in the art that a common cellular radio network also comprises other functions and structures that need not be explained here in greater detail. It is also to be noted that FIG. 3 shows only one structure by way of example. The details in the above-mentioned systems developed by the ARIB and ETSI organizations, for example, may differ from those shown in FIG. 3, the differences being, however, irrelevant to the invention.

Typically, a cellular radio network thus comprises a fixed network infrastructure, i.e. a network part 300, and user equipment 302 that can be positioned fixedly, located in a vehicle or portable. The network part 300 comprises base stations 304. A base station corresponds to node B in the previous figure. A radio network controller 306, in turn, communicating with several base stations 304 controls these base stations in a centralized manner. The base station 304 comprises transceivers 308 and a multiplexer unit 312.

The base station 304 further comprises a control unit 310 controlling the operation of the transceiver 308 and the multiplexer 312. The multiplexer 312 places the traffic channels and control channels used by several transceivers 308 over one transmission connection 314. The transmission connection 314 forms the interface Iub.

The transceivers 308 of the base station 304 communicate with an antenna unit 318 implementing a duplex radio connection 316 to the user equipment 302. The structure of frames transmitted on the duplex radio connection 316 is defined system-specifically and it is called air interface Uu.

The radio network controller 306 comprises a group switch 320 and a controller unit 322. The group switch 320 is used for switching speech and data and for connecting signalling circuits. A radio network subsystem 332 comprising the base station 304 and the radio network controller 306 further comprises a transcoder 324. The transcoder 324 is usually located as close to a mobile services switching centre 328 as possible since speech can then be transmitted in a cellular radio network form between the transcoder 324 and the radio network controller 306 using as little transmission capacity as possible.

The transcoder 324 converts the different digital coding forms of speech used between the public telephone network and the radio telephone network into compatible ones, for example from the fixed network form into another form of the cellular radio network and vice versa. The control unit 322 carries out call control, mobility management, collection of statistical data and signalling.

A core network CN comprises the infrastructure of the mobile telephone system external to the radio connection network. The units of the core network CN shown in FIG. 3 include the mobile switching centre 328 and a gate mobile services switching centre 330 responsible for the connections of the mobile telephone system to the external world; in this connection, to a public telephone network 336. An interface 340 between the core network CN and the radio connection network is thus called Iu.

Figure 4:
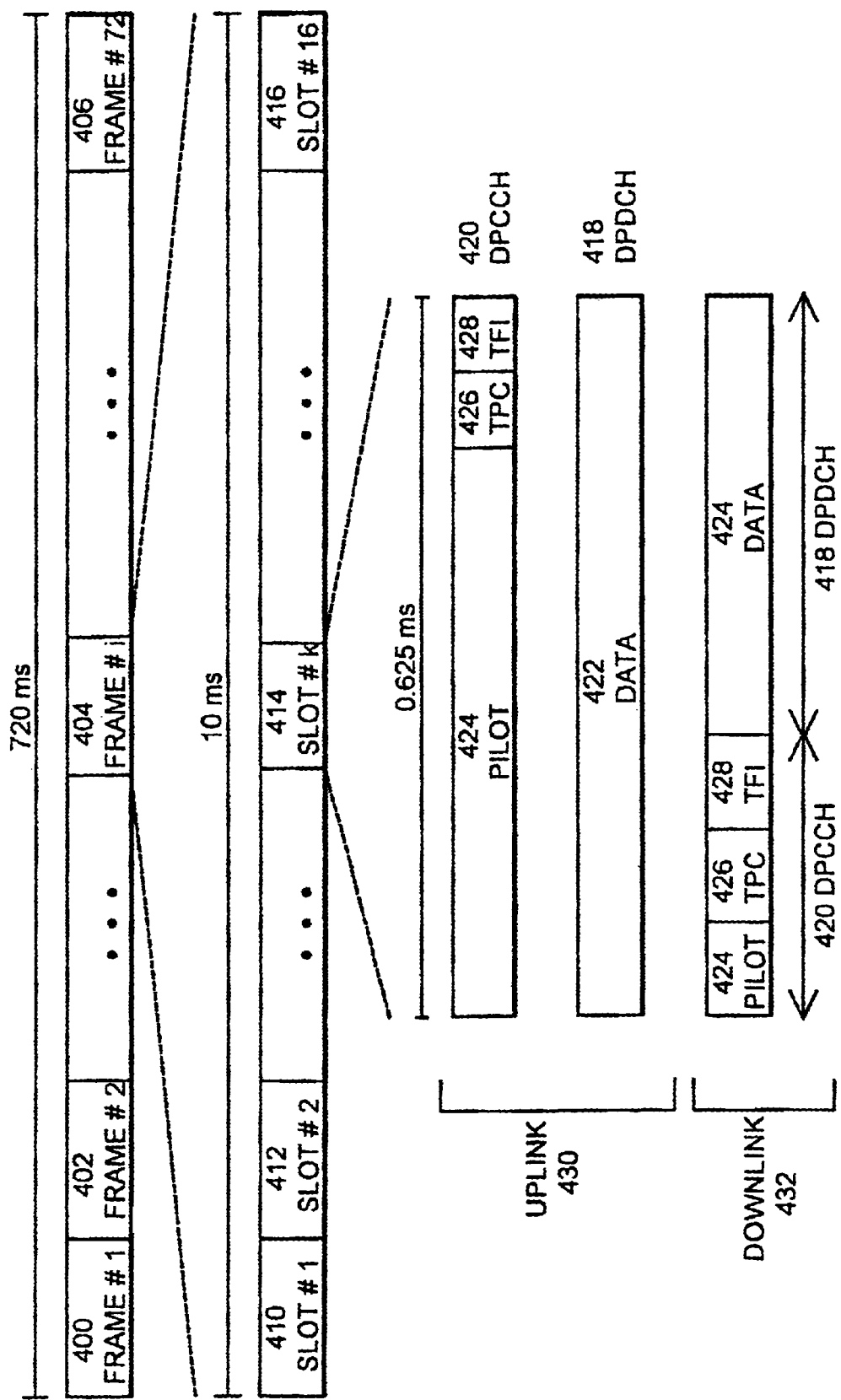
FIG. 4 shows an example of a frame structure used in the system of the invention.

Next, by means of FIG. 4, let us view an example of a frame structure used in the system of the invention. Topmost in FIG. 4 there is shown a 'super frame' which comprises 73 frames 400 to 406 that are successively numbered from 1 to 72. In this exemplary system, the length of the super frame is 720 milliseconds. It is to be noted in this connection that all numerical values used in connection with the examples only exemplify some feasible values and they are not relevant to the invention. The length of each frame is 10 milliseconds. Each frame, for example frame 404, is divided into 16 slots 410 to 416. The length of one slot 414 is 0.625 milliseconds. Typically, one slot corresponds to one power adjustment period, during which power is adjusted by one decibel higher or lower.

Dedicated physical channels can be divided into two different parts: dedicated physical data channels DPDCH 418 and dedicated physical control channels DPCCH 420. The dedicated physical data channels 418 are used for transporting data 422 generated at the second layer of the OSI (Open Systems Interconnection) and above it, in other words primarily dedicated traffic channels. The dedicated physical control channels 420 transport control information generated at the first layer of the OSI. The control information comprises pilot bits 424 used for help in channel estimation, transmit power-control commands TPC 426, and transport format indicators TFI 428. The transport format indicators 428 indicate to the receiver the current transmission rate used for each dedicated physical data channel of the uplink.

On downlink 432, the dedicated physical data channels 418 and the dedicated physical control channels 420 are time-multiplexed to the same slot 414. On uplink 430, on the other hand, the channels are transmitted in parallel such that they are IQ-code-multiplexed (I=in-phase, Q=quadrature) to each frame 404, and modulated using a dual-channel quadrature phase-shift keying modulation QPSK.

Figure 5:
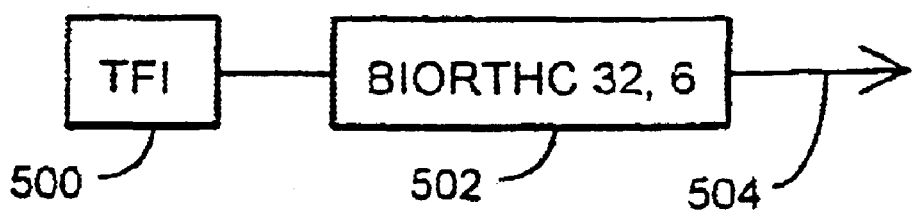
FIG. 5 illustrates an example of the coding of transport format indicators.

In the system of the invention, a frame thus comprises transport format indicators TFI 428 indicating the transmission rate and coding depth used in the frame. The transport format indicators are preferably coded by means of a biorthogonal code, i.e. the bits are mapped by means of Walsh functions. Assume that the number of RI bits is $N_{TFI}$. Consequently, they can be used to express a number of $2^{N_{TFI}}$ different transmission rates. Assume, for example, that $N_{TFI}=6$. Hence, (32,6) biorthogonal coding is used, i.e. 32-bit Walsh functions and the binary complements thereof are used to give 64 code words. The TFI field thus takes up 32 bits, enabling 64 different transmission rates to be expressed. FIG. 5 illustrates the coding. Bits 500 are biorthogonally (32,6) coded 502, whereafter the coded 32 bits 504 are depicted onto a physical channel. The above-described is only one example of the way in which the TFIs can be coded.

Assume now that a signal is received which is known to comprise a component coded by using a coding depth of n*10 ms. The invention utilizes the information that the coding depth of said component must remain the same during one coding block. Hence, in this connection a coding block refers to a period of n*10 ms. Set $m_i$ is formed from all feasible transport format indicator combinations. From all those feasible transport format indicator combinations indicating that a frame comprises information coded using the known coding depth n*10 ms, set $p_i$ is defined. Hence, set $p_i$ is a subset of set $m_i$. Assume, then, that a situation occurs in which a component of the kind described above and another component with a smaller coding depth, for example, such as speech whose coding depth is preferably one frame, i.e. 10 ms, are received. When transport format indicators are decoded it is known that the transport format indicator combinations must belong to set $p_i$ at least during one coding block. If it is now detected that n−x frames have been received, where a positive integer x is lower than n, in which frames a transport format indicator combination belonging to set $p_i$ is identified, and furthermore, x frames are detected whose transport format indicator combination does not belong to set $p_i$, consequently it can be inferred that the TFIs of the frames in question are erroneous. Preferably, x is lower than n/2, i.e. if n frames are received that contain certain TFI information in over half of the frames, i.e. in n−x frames, it is decided that the information in question is correct and the TFI information in the rest of the frames is incorrect.

The data of the detected erroneous frames is set to zero in connection with deinterleaving. The reason for setting the data to zero is that a viterbi decoder and a turbo decoder are less sensitive to zeros than to randomly erroneous bits. If n is sufficiently high, for example 8, and there is only one erroneous frame, the decoder might be capable of correcting the erroneous frame by means of the n−1 frames received correctly since deinterleaving scrambles the successive bits set to zero in n frames.

Figure 6:
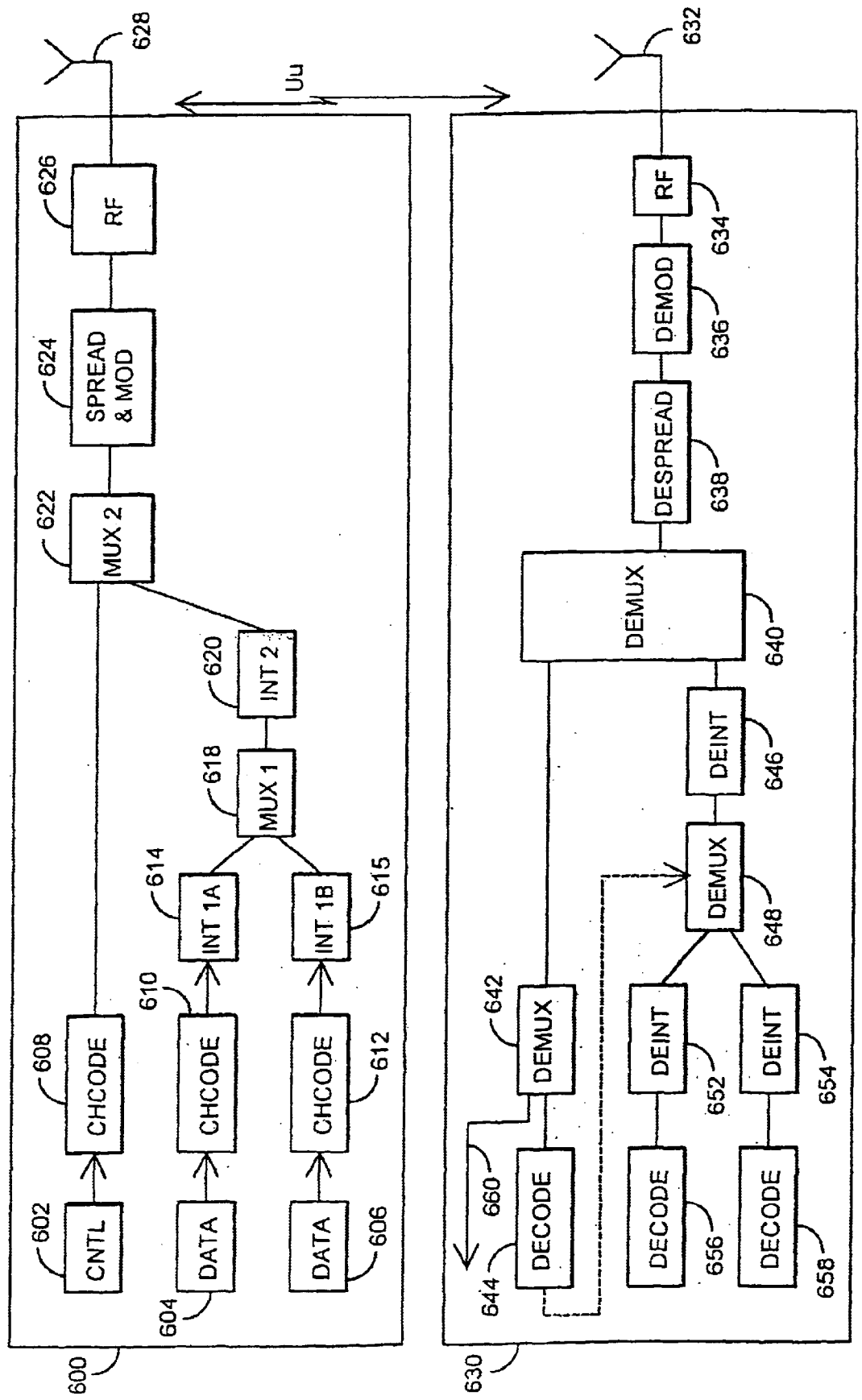
FIG. 6 shows the structure and operation of a transmitter-receiver pair.

FIG. 6 illustrates the operation and structure of a transmitter—receiver pair of the invention. FIG. 6 describes a downlink case where the radio transmitter is located at node B and the radio receiver at user equipment UE.

Block 600 discloses the essential functions of the radio transmitter. Different services to be located in a physical channel include speech, data, moving video or still video picture, and the control channels of the system that are processed in a control part 602 of the radio transmitter. The figure discloses the processing of the control channel and data 604 and 606 of two different services. Different services require different source coding means; speech, for example, requires a speech codec. For the sake of clarity, however, the source coding means are not shown in FIG. 6.

In blocks 608 to 612, different channels are then differently channel-coded. Channel coding includes, for example, different block codes, exemplified by a cyclic redundancy check CRC, for example. In addition, convolutional coding and different variations thereof, punctured convolutional coding or turbo coding, for example, are typically used.

Next, a first interleaving can be carried out for some service data at a first and a second interleaver 614 and 615. The purpose of interleaving is to facilitate error correction. Consequently, instantaneous fading on the radio path does not necessarily make the transmitted information unidentifiable. The services are multiplexed together at a first multiplexer 618. Next, a second interleaving can be carried out at a second interleaver 620. The interleaved data and control channel are multiplexed together at a second multiplexer 622.

The multiplexed bits are then spread by a spreading code, mixed by a mixing code, and modulated at a modulator 624 and supplied to radio frequency parts 626, which can comprise different power amplifiers and filters restricting the bandwidth. The analogue radio signal is transmitted via an antenna 628 to the radio path Uu.

Block 630 of FIG. 6 shows the essential functions of a radio receiver. Typically, if not necessarily, the radio receiver in a CDMA system is a RAKE receiver. The analogue radio frequency signal is received from the radio path Uu by an antenna 632. The signal is supplied to radio frequency parts 634 comprising a filter to block frequencies external to the desired frequency band. Next, at a demodulator 636, the signal is converted to intermediate frequency or directly to baseband, in which form the signal is sampled and quantified.

Since the signal is multipath-propagated, the signal components propagated via different paths are to be combined at block 638 comprising, in accordance with the prior art, several RAKE branches. The signal components received by the RAKE branches at different delays are searched for by correlating the received signal with the spreading codes used that are delayed by predetermined delays. When the delays of the signal components have been found, signal components belonging to the same signal are combined. Simultaneously, the spreading coding of the signal components is decoded by multiplying the signal by the physical channel's own spreading code.

The narrowband signal thus obtained is supplied to a first demultiplexer 640 where the control channel DPCCH and the data channel DPDCH are separated. The control signal is supplied to a second demultiplexer 642 where a pilot signal, power control bits TPC and transport format indicators TFI are separated. The TFIs are forwarded to a first decoder 644, which decodes the transport format indicators TFI. The pilot signal and the power control bits TPC 660 are forwarded to the other parts of the receiver.

In this example, like numerical values are used as in the above. As-sume that a signal is received which is known to comprise a component coded by using a coding depth of n*10 ms. In the receiver of the invention, the first decoder 644 is arranged to detect that n–x frames have been received, where a positive integer x is lower than n, and to identify from the frames transport format indicators indicating the information containing the known coding depth n*10 ms in the frame. The decoder is further arranged to detect that x frames have been received wherein the transport format indicators do not indicate that the signal comprises the information coded using the known coding depth n*10 ms, and to infer that the x frames in question have been received erroneous.

From the first demultiplexer 640 the data signal is supplied to a first deinterleaver 646 where a first deinterleaving is carried out, corresponding to the interleaving carried out at the interleaver 620 of the transmitter. Next, the signal is supplied to a third demultiplexer 648 where different services are separated. The third demultiplexer 648 receives information on the transport format indicators TFI from the first decoder 644. Based on this information, the demultiplexer 648 can separate the different services. The data signals of the services are supplied to a second and a third deinterleaver 652 and 654, and further to a second and a third decoder 656 and 658 where the channel coding used in the transmission, block coding and convolutional coding, for example, is decoded. The convolutional coding is preferably decoded by a Viterbi decoder.

If the first decoder has detected an error in the transport format indicators, the data of the erroneous frames can be set to zero at the deinterleaver which deinterleaves the signal of the service in question, i.e. at the second or the third deinterleaver 652, 654.

The features of a receiver in accordance with the invention can be preferably implemented as suitable program steps in a signal processor or a multi-purpose processor or by using suitable separate components. The rest of the parts of the receiver can be implemented by methods known to those skilled in the art.

Although the invention has been described above with reference to the example in accordance with the accompanying drawings, it is obvious that the invention is not restricted thereto but can be modified in many ways within the scope of the inventive idea disclosed in the attached claims.

What is claimed is:

1. A reception method in a data transmission system, comprising:

transmitting a signal having information in a frame form by using several different transport formats, in which frames (410 to 416) also information on the transport format used is transmitted by means of transport format indicators (428), and in which system the information to be transmitted is coded by a coding depth depending on the properties of the information to be transmitted, at least some of the coding depths being multiples of a given basic coding depth $T_K$;

receiving a signal which is known to contain information coded by using a coding depth of $n*T_K$, if it is detected that n–x frames have been received, where a positive integer x is lower than n, in which frames transport format indicators have been identified indicating that the signal comprises the information coded using the known coding depth $n*T_K$, and x frames wherein the transport format indicators do not indicate that the signal comprises the information coded using the known coding depth $n*T_K$, it is inferred that the x frames in question have been received erroneous, wherein n is a number of frames.

2. A method as claimed in claim 1, further comprising:

defining set $m_i$ from all feasible transport format indicator combinations, and set $p_i$ from all those feasible transport format indicator combinations that indicate that the frame comprises information coded using the known coding depth $n*T_K$, for which $p_i \in m_i$, and upon the reception of the signal, when it is detected that n–x frames have been received, where the positive integer x is lower than n, in which frames a transport format indicator combination has been identified that belongs to set $p_i$, and furthermore, x frames have been detected whose transport format indicator combination does not belong to set $p_i$, it is inferred that the frames in question are erroneous, wherein $m_i$ is a set formed from all feasible transport format indicator combinations, and wherein $p_i$ is a set of the feasible transport format indicator combinations indicating that a frame comprises information coded using coding depth $n*T_k$.

3. A method as claimed in claim 1, further comprising setting the detected erroneous x frames to zero.

4. A method as claimed in claim 3, further comprising setting erroneous frames to zero prior to deinterleaving.

5. A method as claimed in claim 3, wherein the received signal is viterbi-decoded after deinterleaving.

6. A method as claimed in claim 1, wherein the positive integer x is lower than n/2.

7. A receiver in a data transmission system, comprising:

transmitting a signal having information that is transmitted in a frame form by using several different transport formats, in which frames (410 to 416) also information on the transport format used is transmitted by means of transport format indicators (428), and in which system the information to be transmitted is coded by a coding depth depending on the properties of the information to be transmitted, at least some of the coding depths being multiples of a given basic coding depth $T_K$;

receiving a signal which is known to contain information coded by using a coding depth of $n*T_K$, the receiver comprises means (644) for detecting that n−x frames have been received, where a positive integer x is lower than n, and means (644) for identifying from the frames the transport format indicators indicating that the signal comprises the information coded using the known coding depth $n*T_K$, and means (644) for detecting that x frames have been received in which the transport format indicators do not indicate that the signal comprises the information coded using the known coding depth $n*T_K$, and means (644) for inferring that the x frames in question have been received erroneous, wherein n is a number of frames.

8. A receiver as claimed in claim 7, wherein the receiver comprises means (652, 654) for setting the detected erroneous x frames to zero.

9. A receiver as claimed in claim 8, wherein the receiver comprises deinterleaving means (652, 654) setting the erroneous frames to zero.

10. A receiver as claimed in claim 9, wherein the receiver comprises means (656, 658) for viterbi-decoding the received signal after deinterleaving.

11. A receiver as claimed in claim 7, wherein the positive integer x is lower than n/2.

* * * * *